R. P. PERRY.
SULFUR IN GLOBULAR FORM AND PROCESS OF PRODUCING THE SAME.
APPLICATION FILED OCT. 11, 1917.
1,285,358.
Patented Nov. 19, 1918.
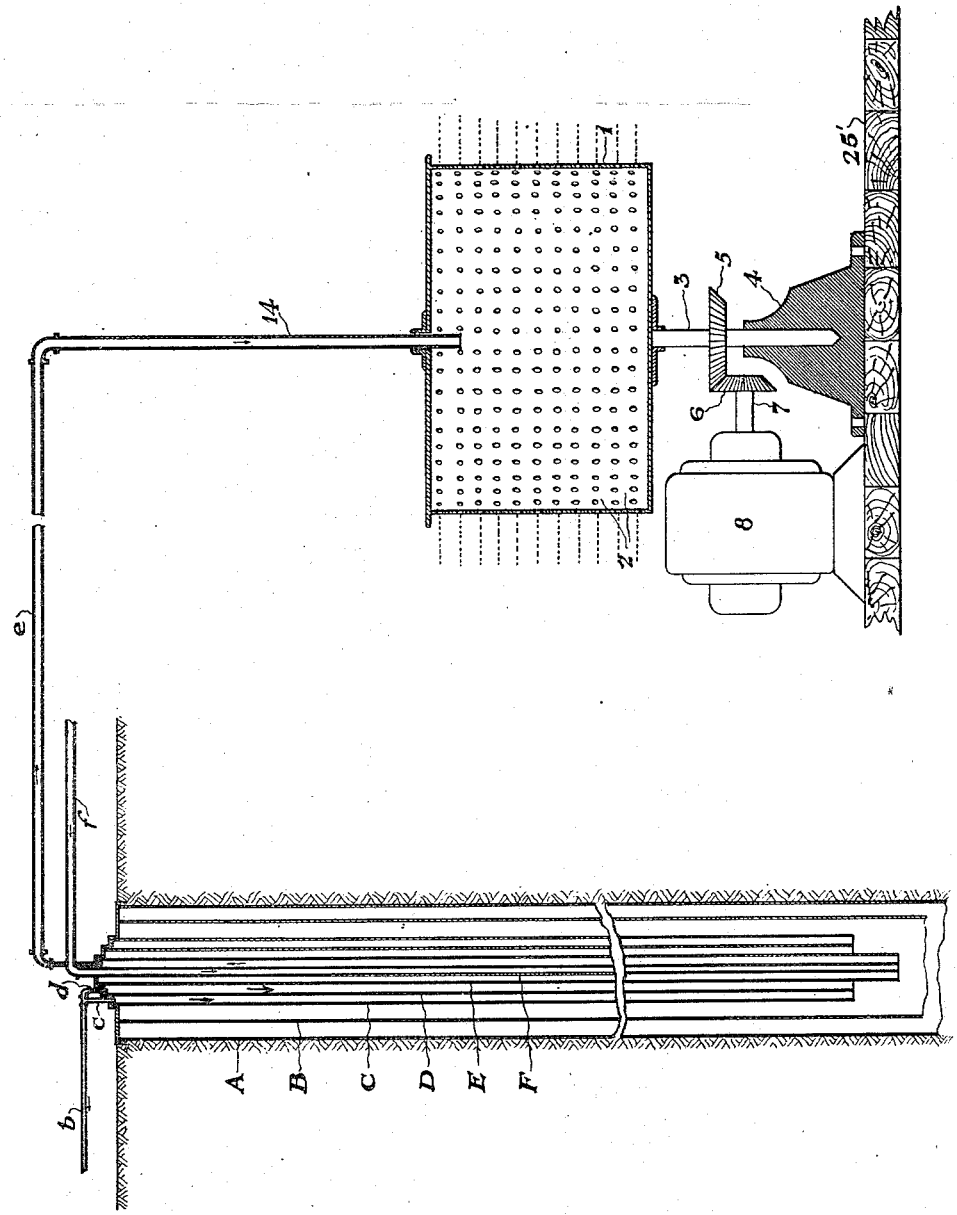
INVENTOR
Ray P Perry
BY
Edward M. Evarts
ATTORNEY

UNITED STATES PATENT OFFICE.

RAY P. PERRY, OF UPPER MONTCLAIR, NEW JERSEY, ASSIGNOR TO THE BARRETT COMPANY, A CORPORATION OF NEW JERSEY.

SULFUR IN GLOBULAR FORM AND PROCESS OF PRODUCING THE SAME.

1,285,358.   Specification of Letters Patent.   Patented Nov. 19, 1918.

Application filed October 11, 1917. Serial No. 196,071.

*To all whom it may concern:*

Be it known that I, RAY P. PERRY, a citizen of the United States, residing at Upper Montclair, in the county of Essex and State of New Jersey, have invented certain new and useful Improvements in Sulfur in Globular Form and Processes of Producing the Same, of which the following is a specification.

My invention relates to improvements in the method of treating and recovering sulfur, and to sulfur in the form of shot-like bodies whereby the sulfur may be readily handled and packaged.

Sulfur, as now obtained, as, for example, by means of the Frasch process, is sent in a molten stream after it leaves the well to bins where it solidifies in very large solid masses. In this form the sulfur is inconvenient to handle, as for shipment, requiring that it be broken by means of steam shovels, pickaxes and the like, and when obtained in this way is in the form of very irregular lumps or pieces. It is often desirable to have the sulfur in a subdivided condition, when it can be more readily handled than when it is in the form of large masses as by screw, or bucket conveyers. Subdivided forms of sulfur are already known, such as flowers of sulfur made by subliming sulfur. It is also known in the art to grind lumps of sulfur under water and in this way effect a subdivision of the sulfur.

I have invented a new process of treating and recovering sulfur whereby the sulfur may be obtained in a subdivided form, when it can be readily handled and packaged. My process, especially when used in connection with any of the processes of recovering sulfur, such as the Frasch process, which at some stage of the recovery process provides the sulfur in a molten condition, permits me to obtain the sulfur in the desired state of subdivision with very little expense. Specifically, the sulfur treated by my process is in the form of solid, substantially shot-like bodies or globules, preferably of small, predetermined, and substantially regular size. While the globular bodies of solid sulfur are preferably small they are of easily measurable size and form a different substance from either the flowers of sulfur or the sulfur ground to a powder under water. The latter material is made up of exceedingly small particles having angular configurations due to their formation by fracture or grinding. The flowers of sulfur furthermore are in the form of an exceedingly fine powder. The sulfur of my invention is in the form of shot or globules which are an easily measurable fraction of an inch in diameter, preferably about 1/30 to 1/50 of an inch in diameter. The sulfur shot or globules of my invention are free from sharp angular parts such as would be produced by fracture or grinding.

In practising my process I do not resort to sublimation, or to grinding. Nor do I permit the sulfur, which at one stage of the process of recovering the same is in a molten condition, as already stated, to become solidified in the large masses already referred to, which masses are, as stated, difficult to handle for shipment. In working my process I send the supply of sulfur at that stage of the recovery of the same when it is in a molten condition directly into a spraying device which subdivides the molten sulfur into numerous streams forming a spray, the spray being injected into a cooling medium, such as air at normal temperatures. The molten sulfur thus injected in the form of a spray into the cooling medium is cooled and solidified in the form of small bodies of shot-like or globular form. By controlling the fineness of the spray and the speed and temperature it is possible to vary the size of the shot or globules of solid sulfur thus produced, it being noted that for a given size of spray and a given speed and temperature, a large portion of the particles formed will be substantially of the same size.

Sulfur in the form just described is readily handled and packaged and can be loaded for shipment by the belt, bucket or screw conveyers. My process is particularly of advantage where it is desirable to ultimately obtain the sulfur in the form of subdivided particles, since by my process I avoid the tedious and laborious steps of sending the sulfur in the form of a molten stream into bins where it cools and solidifies in large masses, which masses are difficult to break up for shipment and ultimate subdivision by the difficult wet-grinding process above referred to.

While my process may be used in connection with any process of recovering or working sulfur which at some stage of the same finds the sulfur in a molten condition, I shall describe it especially in connection with the Frasch process, in connection with which my process finds particularly successful application.

Referring to the drawing wherein I have diagrammatically illustrated partly in section and partly in elevation a form of apparatus for carrying out the process of my invention in the production of the article of my invention, A indicates the usual well for the recovery of sulfur by the Frasch process. Within the well A is the iron pipe B. Within the pipe B are the concentrically arranged iron or other pipes C, D, E and F. Through the pipes C and D is sent in a downward direction superheated water from the inlets $c$ and $d$, respectively, communicating with the source of supply $b$. With the pipe F communicates the source of supply $f$ of compressed air. Under the action of the superheated water the sulphur at the bottom of the well is rendered molten and is sent by the compressed air from the pipe F in an upward direction through the pipe E and out through the outlet pipe $e$.

Instead of being sent into large bins where it is cooled and solidified in large masses, in my process the molten sulfur leaving the well through the pipe $e$ is sent immediately into a spraying or analogous device. While various types of spraying or analogous devices may be used, I prefer to use a centrifugal device of the sort illustrated in the drawing. The molten sulfur coming through the outlet pipe $e$ is delivered through the outlet 14 into the cylindrical or other container 1 having one or more rows of apertures 2 substantially horizontally disposed. The container 1 is driven or rotated at any desired rate of speed by being mounted on the shaft 3 which is supported in the bearing 4. Fixedly mounted on the shaft 3, a small distance above the bearing 4, is a bevel gear 5 which meshes with a corresponding bevel gear 6, which is fixed on the shaft 7 of an electric or other motor 8. By setting the motor 8 in operation it is obvious that the container 1 will be rotated through the mediation of the bevel gears 5 and 6.

In operation the molten sulfur is fed through the outlet 14 into the container 1. The container 1 is rapidly rotated at any desired rate of speed by the meshing bevel gears 5 and 6 which are set in motion by the motor 8. Due to the centrifugal force of the rapidly rotating container 1 the molten sulfur is forced or extruded through the apertures 2, which are of predetermined size, in the form of streams of molten sulfur, which streams, when they are injected into the air, break up into drops which solidify in the form of shot-like or globular bodies. The bodies thus formed fall in a solidified condition upon the floor or other support 25' where they are gathered together for any desired purpose.

What I claim is:

1. The process of treating sulfur, comprising the steps of providing from its source in the ground a supply of molten sulfur, and thereafter, and before the sulfur has become solidified, injecting the molten sulfur in the form of a spray into a cooling medium, whereby the sulfur is cooled and solidified in the form of small globular bodies.

2. The process of recovering sulfur, comprising the steps of fusing the sulfur from its source in the ground, and thereafter, and before the fused sulfur has become solidified, injecting the fused sulfur in the form of a spray into a cooling medium, whereby the sulfur is cooled and solidified in the form of small globular bodies.

3. The process of recovering sulfur, comprising the steps of fusing the sulfur in subterranean sulfur deposits by the action of superheated water, and thereafter, and before the fused sulfur has become solidified, injecting the fused sulfur in the form of a spray into a cooling medium, whereby the sulfur is cooled and solidified in the form of small globular bodies.

4. The process of obtaining sulfur in convenient form for handling and use which consists in melting the sulfur to recover the same from its place of origin, passing it before cooling through a revolving centrifugal machine and thereafter cooling it whereby it assumes the solid form of separate, small, round particles.

5. In the process of producing sulfur in convenient form for handling and use, the step which consists of passing the molten sulfur through a perforated revolving centrifugal basket on its way between the place of origin and the place of storage.

6. The herein described product, comprising solid sulfur in the form of comparatively small shot-like bodies.

7. The herein described product, consisting of solid sulfur in the form of small globular bodies of appreciable size devoid of sharp, angular parts such as would be produced by fracture.

8. The herein described product comprising solid sulfur in the form of small globular bodies.

In testimony whereof I affix my signature.

RAY P. PERRY.